United States Patent
Ghosh et al.

(10) Patent No.: US 11,652,710 B1
(45) Date of Patent: May 16, 2023

(54) SERVICE LEVEL AGREEMENT AWARE RESOURCE ACCESS LATENCY MINIMIZATION

(71) Applicant: International Business Machines Corporation, Armonk, NY (US)

(72) Inventors: Partho Ghosh, Kolkata (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/550,005

(22) Filed: Dec. 14, 2021

(51) Int. Cl.
　　*G06F 15/173* (2006.01)
　　*H04L 41/5019* (2022.01)
　　*G06F 9/50* (2006.01)
　　*G06F 9/455* (2018.01)
　　*H04L 43/55* (2022.01)

(52) U.S. Cl.
　　CPC .......... *H04L 41/5019* (2013.01); *G06F 9/455* (2013.01); *G06F 9/50* (2013.01); *H04L 43/55* (2022.05); *G06F 2209/501* (2013.01)

(58) Field of Classification Search
　　CPC ..... H04L 41/5019; H04L 43/55; G06F 9/455; G06F 9/50
　　USPC .................................................. 709/203, 226
　　See application file for complete search history.

(56) References Cited

U.S. PATENT DOCUMENTS

| | | | |
|---|---|---|---|
| 2006/0161883 A1* | 7/2006 | Lubrecht | G06Q 10/06 717/104 |
| 2013/0124712 A1 | 5/2013 | Parker | |
| 2013/0138816 A1* | 5/2013 | Kuo | G06F 9/5011 709/226 |
| 2014/0068073 A1* | 3/2014 | Peles | G06Q 10/0639 709/224 |
| 2015/0032894 A1 | 1/2015 | Rosensweig et al. | |
| 2015/0106143 A1* | 4/2015 | Rai | H04L 41/5051 705/7.14 |
| 2015/0134823 A1 | 5/2015 | Cucinotta et al. | |

(Continued)

OTHER PUBLICATIONS

Ishakian, Vatche et al., "MORPHOSYS: Efficient Colocation of QoS-Constrained Workloads in the Cloud", arXiv: 1912.00549v1 [cs.DC] Dec. 2, 2019, 37 pages.

(Continued)

*Primary Examiner* — Duyen M Doan
(74) *Attorney, Agent, or Firm* — Stephen J. Walder, Jr.; Jordan Schiller

(57) ABSTRACT

Mechanisms for redistributing computing resources in a distributed data processing system is provided. Performance metrics are collected for processing requests associated with a computer operation for which there is an established service level agreement (SLA) having a required SLA performance metric. The performance metrics are compared to the SLA performance metric to select an SLA for which the SLA performance metric is being met. A plurality of computer simulations are executed that simulate different distributions of computing resources. Simulation results are compared to the SLA performance metric to identify one or more computer simulations whose results either meet, exceed, or are closest to the SLA performance metric of the selected SLA. A distribution of computing resources is selected based on the comparison and the computing resources are redistributed accordingly.

20 Claims, 6 Drawing Sheets

(56) References Cited

U.S. PATENT DOCUMENTS

| | | | |
|---|---|---|---|
| 2016/0072730 A1* | 3/2016 | Ju | H04L 41/14 709/224 |
| 2017/0091781 A1* | 3/2017 | Puvvala | G06Q 30/016 |
| 2019/0325304 A1* | 10/2019 | Gottin | G06N 3/045 |
| 2021/0081254 A1 | 3/2021 | Reeve et al. | |
| 2021/0194778 A1 | 6/2021 | Tidemann et al. | |

OTHER PUBLICATIONS

Pubnub Staff, "Cloud Computing Latency, Defined", PubNub Blog, Feb. 20, 2020, 4 pages.

Sinha, Amitabh, "The Public Cloud Drive to Lowest-Latency Infrastructure", Workspot, Inc., Jun. 4, 2020, 3 pages.

\* cited by examiner

SERVICE LEVEL AGREEMENT AWARE RESOURCE ACCESS LATENCY MINIMIZATION

BACKGROUND

The present application relates generally to an improved computing tool and improved computing tool operations that perform service level agreement (SLA) aware resource access latency minimization.

Service Level Agreements (SLAs) are legally binding contracts between service providers and one or more clients in an information technology (IT) environment. That is, the client enters into an agreement with the service provider for services provided via one or more computing and/or data storage devices in a data processing system, which may be a stand-alone data processing system but is more often a distributed data processing environment in which the service provider provides one or more servers or other computing devices, and/or storage devices, and the client uses one or more client computing devices accessing the services of the service provider via one or more data networks. These SLAs define the specific terms and agreements governing, among other factors, the quality standards and the performance requirements of the service provider which are typically defined in terms of performance metrics, also referred to as SLA metrics. For example, these SLA metrics may specify required amounts of storage capacity, required response times, required bandwidth availability, required processor resource availability, required "up-time", and the like. The SLA may be defined in terms of an SLA data structure that stores data defining these SLA metrics, or requirements.

Data centers are a large group of networked computer servers used by organizations for remote storage, processing, or distribution of large amounts of data. The data center is the physical facility that makes enterprise computing possible. The data center houses the enterprise computing systems, the networking equipment and associated hardware needed to ensure the computing systems' ongoing connectivity to the Internet or other business networks, the power supplies and subsystems, electrical switches, backup generators, and environmental controls (such as air condition and server cooling devices) that protect the data center hardware and kit it up and running. A data center is central to an enterprise's IT operations and is a repository for the majority of business-critical systems, where most business data is stored, processed, and disseminated to users.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method for redistributing computing resources in a distributed data processing system is provided. The method comprises collecting performance metrics of processing of requests associated with a computer operation for which there is an established service level agreement (SLA) having at least one required SLA performance metric. The method also comprises comparing the performance metrics to the SLA performance metrics to select an SLA for which the at least one SLA performance metric is not being met. Moreover, the method comprises executing a plurality of computer simulations comprising computer models of computing resources of the distributed data processing system, each computer simulation simulating a different distribution of computing resources in the distributed data processing system. In addition, the method comprises comparing simulation results of the computer simulations to the at least one SLA performance metric to identify one or more computer simulations whose results either meet, exceed, or are closest to the at least one SLA performance metric of the selected SLA. Furthermore, the method comprises selecting a distribution of computing resources corresponding to a computer simulation whose simulation results either meet, exceed, or are closest to the at least one SLA performance metric. The method also comprises redistributing the computing resources of the distributed data processing system in accordance with the selected distribution of computing resources.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Maintaining the security and reliability of data centers is essential to protecting an enterprise's operational continuity, i.e., its ability to conduct business without interrupt. Moreover, providing expected or required levels of performance and reliability from the data center resources is also of significant concern.

In a data center environment where the data center is located in a single location, latency of access to the resources of the data center may be minimized precisely because the resources being accessed share the same location and a common set of infrastructures. The time taken to get from the source computing system to the destination computing system is lower when resources are physically close together. However, data center implementation in a cloud computing environment or distributed data processing system environment, where the resources of the data center are distributed across multiple locations that may be physically located remote to one another, or distributed across multiple data centers at disparate locations, leads to significant latency of access to data center resources. Cloud computing environments are built for scale and thus, cloud-hosted resources may not be in the same rack, data center, or even geographical or physical region.

This distributed approach to data center resources can have a significant impact on the round-trip time (RTT) of network communications. While the regions of the cloud computing environment may be interconnected by a high-speed data network communication backbone, the speed of the backbone is still limited, even if using a high speed fiber optic communication connection that operates at the speed of light. Communications between services in different physical locations will still have network latency directly correlated to the distance between them.

In addition, the more traffic an application generates, the more round trips that are required for the application to perform its operations. Each round trip comes with a latency that adds to the overall latency of performing the corresponding application operations. Thus, the latency perceived by the user is the combination of the round trips required to service the user's request.

Figure 1:
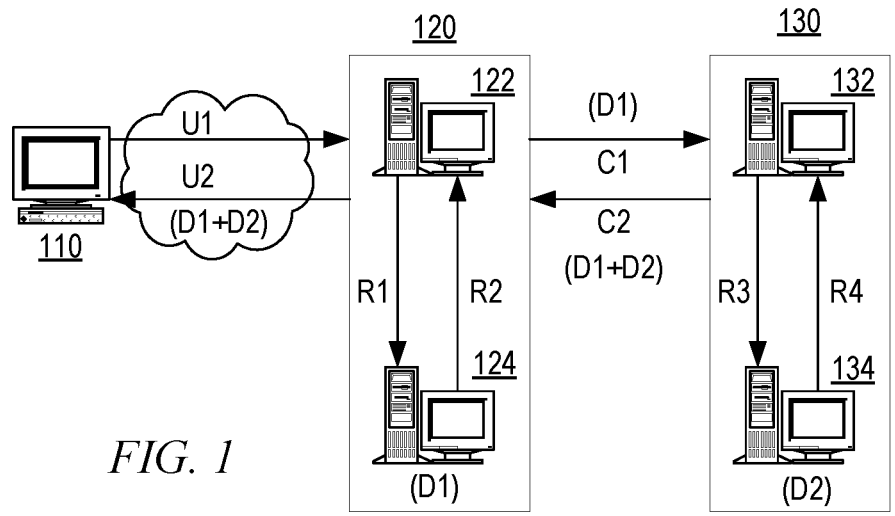
FIG. 1 is an example diagram representing the data flow for processing a request in accordance with one example, illustrating round trip time (RTT) issues in a distributed data center.

FIG. 1 is an example diagram illustrating latency in a distributed data center environment, such as a cloud computing environment hosted data center. As shown in FIG. 1, a user of a client computing device 110 may, via an application running on client computing device 110, request an operation to be performed, request retrieval of a particular set of data, or otherwise submit a request that requires accessing resources of one or more data centers hosted by a plurality of computing devices distributed across multiple regions 120 and 130 of the cloud computing environment 100. For purposes of illustration, a single distributed data center is assumed. It is further assumed, for purposes of this illustration, that the resources required to process the request are distributed between computing/storage devices of the two regions 120 and 130, which each may comprise one or more computing devices 122, 124 and 132, 134. In FIG. 1, data flows between the user and the data center are referenced with the reference label "U", data flows between data center resources in different regions 120, 130 of the cloud computing environment 100 are referenced with the reference label "C", and data flows between resources in the same region are referenced with the label "R".

The request is received by a computing device 122 in a first region 120 of the data center. However, not all of the resources are present in the first region 120. In a single location based data center, the computing devices 122, 124 of the first region 120 would house all of the required resources and can respond directly back to the user's request by utilizing the resources in the first region 120 to fully respond to the request, e.g., returning requested data to the client computing device 110. However, as the data center is distributed in a cloud computing environment across multiple regions 120, 130, additional requests and resource accesses C1, R1, R2, and C2 are needed in order to respond to the user's original request. Each of these add additional latency beyond that which would be required if all of the resources were housed in a single region 120, i.e., if the resources where local to one another.

For example, assume that the user request U1 from the client computing device 110 requested sales data across multiple geographical regions, e.g., sales data from the entire United States (US), which comprises the west US region 120 and the east US region 130. In order to provide more efficient access to resources for each of the portions of the enterprise in the different geographical regions corresponding to regions 120 and 130, the data (D1 and D2) for those portions of the enterprise are housed locally in computing systems and storage devices of the cloud computing environment located in regions 120 and 130. For example, if the enterprise has a regional office in the western US, the data (D1) and resources utilized by that regional office are provided by the west US region 120 of the data center in the cloud computing environment. This permits lower latency access to resources by that regional office. Similarly, a regional office in the eastern US will have their data (D2) and resources hosted by the east US region 130 of the data center in order to promote lower latency of access to those resources. However, for requests that require access to resources across regions, the latency will be increased.

Thus, in order to satisfy the original request of sales data across regions 120 and 130, the computing systems 122, 124 of the first region 120 must perform their operations within the first region 120 to satisfy the request which may include, for example, accessing one or more databases, performing query language processing, such as SQL processing or the like, to retrieve portions of data D1 satisfying the criteria of the request. This may involve round trip data communications between resources within the same region 120, e.g., data communications R1 and R2 in FIG. 1. Moreover, the computing system 122 must then send the resulting data, e.g., D1, a portion of D1, or results generated from processing D1 (assumed to be D1 for purposes of illustration), to the computing systems 132, 134 in the second region 130 in order to combine the resulting data D1 with the results obtained from accessing the data D2 held by region 130, e.g., performing a SQL Join operation or the like. This may involve round trip data communications between resources within the same region 130, e.g., R3 and R4. The resulting data, e.g., the joined D1 and D2 are then returned by the computing systems in region 130 to the computing systems in region 120 which then provide the requested results back to the user 110.

Each of the data communications as well as the accesses and processing within each of the computing systems adds latency to responding to the user's request. Thus, rather than having only the latency associated with U1 and U2 in a situation where the required data/resources are entirely present in region 120, additional latencies associated with C1, C2, R3, and R4 are encountered in the example shown in FIG. 1. It can be appreciated that this latency only gets larger as more regions are included in the data center such that large or global enterprises having their data and resources spread across a large number of regions of a cloud computing hosted data center encounter large latencies with regard to certain user requests.

Often with cloud computing system hosted services, such as a data center being hosted by a cloud computing system service provider, service level agreements (SLAs) are in place to govern the level of service that the service provider must provide to the client, e.g., the enterprise in this case. These SLAs specify the service in terms of performance metrics, referred to also as SLA metrics, which can be used to determine whether the service provider is providing adequate and agreed upon service to the client. These SLAs may be defined in SLA data structures which specify these SLA metrics. The SLA data structures may be used to evaluate actual performance measured through various performance metric data gathering mechanisms of the cloud computing system infrastructure. For example, the SLA metrics may specify required bandwidth availability, required up-time, required data throughput, required responsiveness measures, such as round trip time (RTT) on servicing requests, etc.

These SLA metrics may be specified for a particular enterprise, and may be specific to particular business processes, or set of one or more computer operations, within the enterprise. For example, a set of SLA metrics may be specified for accounting computer operations of the enterprise and a different set of SLA metrics may be specified for sales computer operations of the enterprise. Thus, different business processes, or sets of one or more computer operations, may have different associated sets of SLA metrics and hence, different SLA requirements. In some cases, a single enterprise may have multiple different SLAs with the same service provider, each SLA being associated with a different business process, or set of one or more computer operations. For ease of explanation hereafter, it will be assumed that multiple different SLAs, and corresponding SLA data structures, are established between a service provider and a client, each SLA being associated with a different business process, or set of one or more computer operations (hereafter referred to collectively as a "business process").

SLAs and the use of SLAs to determine whether agreements between service providers and clients are being satisfied is generally known in the art and thus, a more detailed description is not provided herein. Moreover, mechanisms for measuring performance and gathering performance data from a service provider's computing system infrastructure are generally known in the art and a more detailed description is not provided herein. Suffice it to say that a cloud computing hosted service provider service, such as a cloud hosted data center, will have performance measuring mechanisms to gather performance metric data which may then be compared to established SLAs with clients to determine whether the terms and conditions of the SLAs, as specified by the required SLA metrics, are being satisfied.

Because of the additional latency introduced into servicing requests due to the distributed data and resources of cloud computing hosted services, such as in the case of cloud hosted data centers, it may not be possible to meet SLA requirements for all users of an enterprise. That is, looking at the example in FIG. 1 again, while the users in regions 120 and 130 may submit requests and have those requests satisfied within the terms and conditions of the SLA when the data and resources are local to those regions 120 and 130, respectively, when the data and resources are distributed across multiple regions, the same SLA requirements may not be met. Thus, it would be beneficial to have an improved computing tool and improved computing tool operation that dynamically determines when and how to reconfigure distributed data and resources to regions of a distributed data center so as to be able to meet SLA requirements.

The illustrative embodiments provide an improved computing tool that minimizes distributed resource access latency based on service level agreements (SLAs). The illustrative embodiments identify SLAs whose requirements are not being met and whose associated business processes involve requests that are satisfied by resources spanning multiple regions of the distributed configuration. Simulations of redistribution of the resources are executed to generate predicted performance metrics which are then compared to the SLA requirements. Optimized results are selected based on the results of the comparison and a redistribution plan is generated and executed to redistribute resources to minimize latency and achieve SLA requirements as much as possible.

Before continuing the description of the illustrative embodiments, it should be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should further be appreciated that the present description uses the term "resource" to refer to data and/or computer system hardware/software components collectively. That is a resource may be a portion of data stored by one or more computing systems. A resource may be hardware of the one or more computing systems, e.g., one or more processors, or one or more portions of processor time for processing data where the processors may be multithreaded or the like. The hardware may be any type of hardware present in the computing system(s) including the processor, but may also include storage, communication hardware, etc. The resource may also be software, such as applications executing on the one or more computing systems. Of course, the resources may be any combination of these as well. For ease of explanation herein, it will be assumed that the resource requested from a distributed data center is a portion of data stored by the data center. However, it should be appreciated that in accessing the data from the data center, other resources, including both hardware and software resources, may be required to process and return that data to service a request.

With the mechanisms of the improved computing tool and improved computing tool operations of the illustrative embodiments, an automated dynamic resource redistribution (DRR) engine is provided that operates in conjunction with an SLA auditing engine. The SLA auditing engine operates on the previously established SLA data structures for an enterprise (again assuming, for purposes of illustration, multiple SLAs, each associated with a corresponding business process) and performance metric information gathered by performance metric monitoring mechanisms in the service provider's distributed computing system infrastructure, to determine if SLA requirements are being met or not. For those SLAs where SLA requirements are not being met, the mechanisms of the improved computing tool of the present invention operate to determine an optimization to the configuration of the resources that either achieve the SLA requirements or more closely meet the SLA requirements.

In particular, for those SLAs flagged by the SLA auditing engine as not being satisfied, the automated DRR engine operates to determine for the corresponding business process, whether the resources for servicing that business process are distributed across multiple regions. For purposes of description of the illustrative embodiments, it will be assumed that the business processes are accessing resources of a distributed data center in which the resources are distributed across multiple regions of the distribute data center, which may correspond to different physical and/or geographical locations. The determination of whether the business process accesses resources from multiple regions may be performed based on metadata associated with the data returned to the business process which may specify the region and/or address information for the source of the data returned, e.g., D1 came from computing system 122 having source address A1 and D2 came from computing system 132 having source address A2, such that the metadata may be used to map the computing system to a particular region. For example, a mapping data structure may be pre-established that correlates particular computing devices with particular regions, particular addresses, e.g., Internet Protocol (IP) addresses with a particular region, or the like. In some cases, application code analysis is performed to identify usage patterns of required data elements and map those required data elements to locations across one or more regions of the distributed data center. If more than one region is identified as being used to respond to requests associated with the business process of the SLA that is not being satisfied, then it is considered a multi-region SLA. If only one region is identified as being used to respond to these requests, then it is a single region SLA. The optimizations are only applied to multi-region SLAs as it is only in the case of multi-region SLAs that reconfiguration of the resources between regions is able to cause an improvement in performance metrics and reduce latency, which may satisfy SLA requirements that are not currently being satisfied.

In particular, with regard to some illustrative embodiments, the automated DRR engine operates to reduce latency in responding to requests associated with the business process. This optimization determines when and how to reconfigure the resources by redistributing and/or consolidating resources across the regions of the data center. For example, the automated DRR engine may, through optimization operations performed by the automated DRR engine, determine how to swap the locations of the resources, or a portion of the resources, across the regions of the data center, migrate the resources or portion thereof, or replicate the resources or portion thereof, so as to reduce the round-trip time (RTT) network communication latency and modify performance metrics to be within the SLA requirements or as close to the SLA requirements as possible.

This optimization may operate to generate RTT latency and performance such that reconfiguration of the resources through migration and/or replication is minimized while generating performance metrics that meet the SLA requirements, e.g., move/replicate as little of the data as necessary in other regions as is required to achieve the SLA requirements. That is, the optimum for responding to a request may be to have all the resources required to respond to the request collocated and within as short a physical distance to the requestor as possible, thereby minimizing latency. However, this is not an optimal solution when users are distributed across multiple regions as are the resources. Thus, the optimal solution is one where the resources are as close to the users, or sources of requests, as possible, across all possible users. This would require keeping resources in their regions as much as possible but identifying and migrating/replicating only those resources that are necessary to meet SLA requirements. For example, an optimum solution may be to redistribute resources so that SLA requirements are met, but in which the performance metrics of the redistribution are closest to the SLA requirements relative to other redistribution options, thereby minimizing migration/replication while still achieving the SLA requirements.

The automated DRR engine uses the region location information of the resources, as well as information regarding types of the resources involved in the business process and the volume of data and assets (resources) of the various computing systems of the various regions utilized in responding to requests associated with the business process. This information provides a usage pattern for resources of the distributed data center that are associated with the business process. That is, the usage pattern information specifies what resources are accessed, where these resources reside, how these resources are accessed, and the performance metrics associated with accessing these resources from their current locations, e.g., the RTT for accessing the resources. This information may be obtained for each individual region where resources are accessed, and for the multi-region configuration of the specific combination of regions of the distributed data processing system involved in servicing the requests associated with the business process.

This usage pattern information is used as a basis for simulating reconfigurations of the resources across the regions of the distributed data center. The automated DRR engine executes a plurality of simulations, either in parallel or sequentially, to simulate different configurations of the resources and generate predictions as to the performance metrics with regard to the various components of the distributed data center. Each simulation simulates the performance of the distributed data center given a request associated with the business process, but using a different configuration, or distribution, of the resources across the computing systems of the regions of the distributed data center. This simulation is configured with parameters that model the performance of the various computing systems and resources based on the historical data gathered from the performance metric gathering mechanisms present in the infrastructure. This performance metric data specifies how each computing system and resource performs in response to requests associated with the business process, e.g., RTT or latency metrics of the corresponding computing systems' portion of the process for handling the request. Thus, the simulation may be comprised of models for each of the computing systems of the various regions as well as the resources of those computing systems which execute to simulate the corresponding computing system/resources. In some illustrative embodiments, the simulations simulate various combinations of data and data volumes flowing from various source computing/storage systems (without actually moving the data), and estimating the effects of redistribution of this data and data volume flows on the performance of computer operations associated with SLAs, e.g., how much latency can be reduced by reducing round trip time (RTTs) of the data communications.

Each of a plurality of possible reconfigurations or distributions of the resources may be evaluated using different simulations. The particular reconfigurations or distributions of resources may be specified in accordance with configuration information associated with the automated DRR engine. For example, configuration information may specify that X number of simulations are to be performed where each simulation assumes a different percentage of the resources are moved from the slowest RTT components to the fastest RTT components, where slowest and fastest are determined by comparison of RTT with other components of the distributed data center involved in the handling of the request associated with the business process. Other configuration information may specify to move Y % of the resources to a different component of the distribute data processing system that is physically located in a region that is between the slowest RTT component and the fastest RTT component. Various configuration information may be provided to specify which simulations to execute.

Each simulation will generate a prediction should the resources, or a portion of the resources, be relocated, or distributed, to different computing systems of different regions of the distributed data center. The prediction includes performance metrics that are directed to the SLA requirements of the SLA associated with the business process, e.g., RTT for responding to a request associated with the business process.

The predictions may be compared to the SLA requirements to determine which simulation results indicate a configuration or distribution of resources that causes the performance of the distributed data center to fall within the SLA requirements. There may be multiple configurations or distributions of resources that result in performance metrics that meet or exceed SLA requirements, e.g., faster RTT than required by the SLA requirements. Selection criteria may be established for selecting a solution from these configurations/distributions that meet the SLA requirements. These selection criteria may include, for example, selecting the slowest RTT configuration/distribution that still meets the SLA requirements. Such a selection criteria may operate to minimize reconfiguration or re-distribution of resources while still meeting the requirements of the SLA. Other selection criteria may be to select the fastest RTT configuration/distribution that meets the SLA requirements. Of course, more complex selection criteria may be provided that may be based on amounts of resources relocated through migration/replication, RTT, and other performance metrics which may or may not be associated with the SLA requirements.

It should be appreciated that in some situations the simulations may generate predictions where none of the simulated configurations/distributions of resources result in performance metrics that meet or exceed the SLA requirements. In such a case, the simulation results may be ranked based on which simulations results are closest to the SLA requirements, by comparing the simulation results to the SLA requirements. A configuration/redistribution of resources whose simulation results are closest to the SLA requirements may then be selected as a solution for improving the performance of the distributed data center with regard to the SLA. Of course, other selection criteria may be specified as well, such as cost estimates for migration/replication, cost estimates for hosting the redistributed resources, and other considerations or criteria that are evaluated in combination with the performance metrics, such as reductions in RTT or latency.

Based on the selected configuration/redistribution of resources, i.e., the configuration/redistribution of resources used in the simulation whose results are selected as the optimum results by comparison to the SLA requirements, a resource migration/replication plan is automatically generated for moving/replicating resources between the computing systems of the various regions of the distributed data center. The resource migration/replication plan may specify an optimum sequence of data and asset migration/replication as well as timing and other factors for implementing a redistribution of resources. For example, the resource migration/replication can be scheduled during scheduled maintenance times, when determined activity levels are detected, or the like.

After migration/replication, the automated DRR engine switches the connection associated with the migrated/replicated resource to the migrated/replicated data and assets (resources). In the case of a migration, the previous location of data/assets may be removed. Thus, for example, if customer data is present in a first location to which an application requesting an operation connects, and the data is then migrated to another location in accordance with the operation of the illustrative embodiments to meet or approximate SLA requirements, the connection configuration may be automatically updated in the application and/or through a mapping data structure specifying the new location of the data, so that the data's new location is accessed by the application instead. In this way, the resources are migrated/replicated so as to implement the optimized reconfiguration/redistribution of resources predicted by the simulations to satisfy SLA requirements or at least be closest to the SLA requirements if not satisfying the SLA requirements. This process may be performed for each business process to thereby optimize the resource configuration/distribution for all of the business processes affected by the SLAs.

Figure 2:
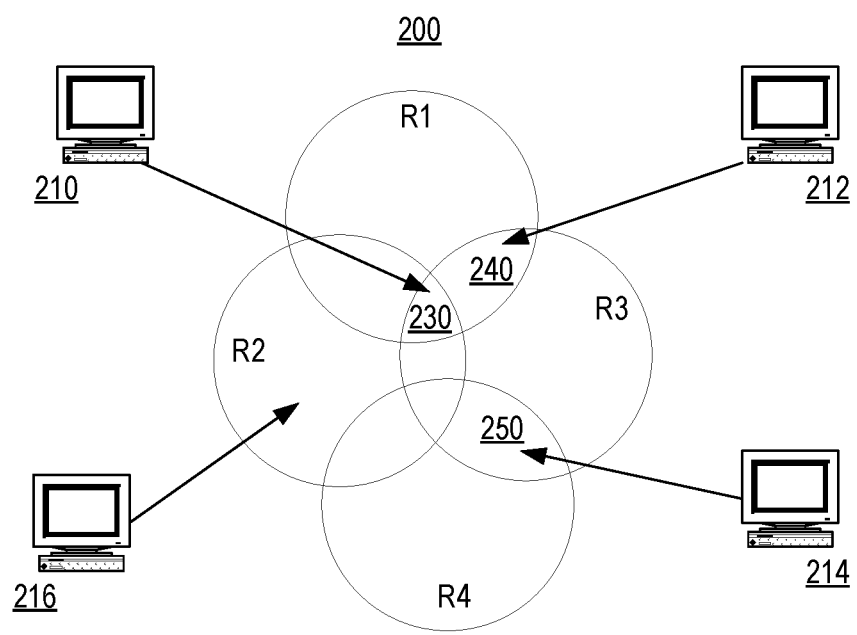
FIG. 2 is an example conceptual diagram of a distribution of data center resources in accordance with one illustrative embodiment.

To further illustrate the optimization performed by the mechanisms of the illustrative embodiments, consider the conceptual diagram of a distribution of data center resources shown in FIG. 2. In FIG. 2, the data stored in various regions R1-R4 of the distributed data center 200 are shown as circles of a Venn diagram where overlaps represent portions of the overlapped regions that are used together to satisfy business process requests. For example, assume that there is a user of a client computing device 210 that is involved in sending requests to the distributed data center 200 for a particular business process, and those requests are serviced by the combination of data in the overlapping region 230, i.e., data for responding to the request exists in regional computing systems for regions R1, R2, and R3. Other users of other client computing devices 212 may send requests that are serviced by data stored in overlapping region 240 involving resources of computing systems for regions R1 and R3. Still other users of other client computing devices 214 may send requests to the distribute data center that involve only resources of regions R3 and R4 (overlapping area 250), and the like. Each of the SLAs associated with each of these different business processes may be evaluated in the manner previously described above and the resources represented by the overlapping areas redistributed in accordance with the mechanisms of the illustrative embodiments such that SLA requirements are met or exceeded, or if not able to be met or exceeded, are as close to the SLA requirements as possible as determined from the simulations. This may result in a modification of the Venn diagram such that the overlap areas may become smaller or larger depending on the reconfiguration/redistribution that optimizes conformance with the SLA requirements.

The present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides service level agreement (SLA) based automated dynamic resource redistribution. The improved computing tool implements mechanism and functionality, such as that associated with the automated dynamic resource redistribution (DRR) engine described hereafter, which cannot be practically performed by human beings either outside of, or with the assistance of, a technical environment, such as a mental process or the like. The improved computing tool provides a practical application of the methodology at least in that the improved computing tool is able to automatically redistribute resources involved in a multi-regional resource processing of requests so as to meet SLA requirements.

Figure 3:
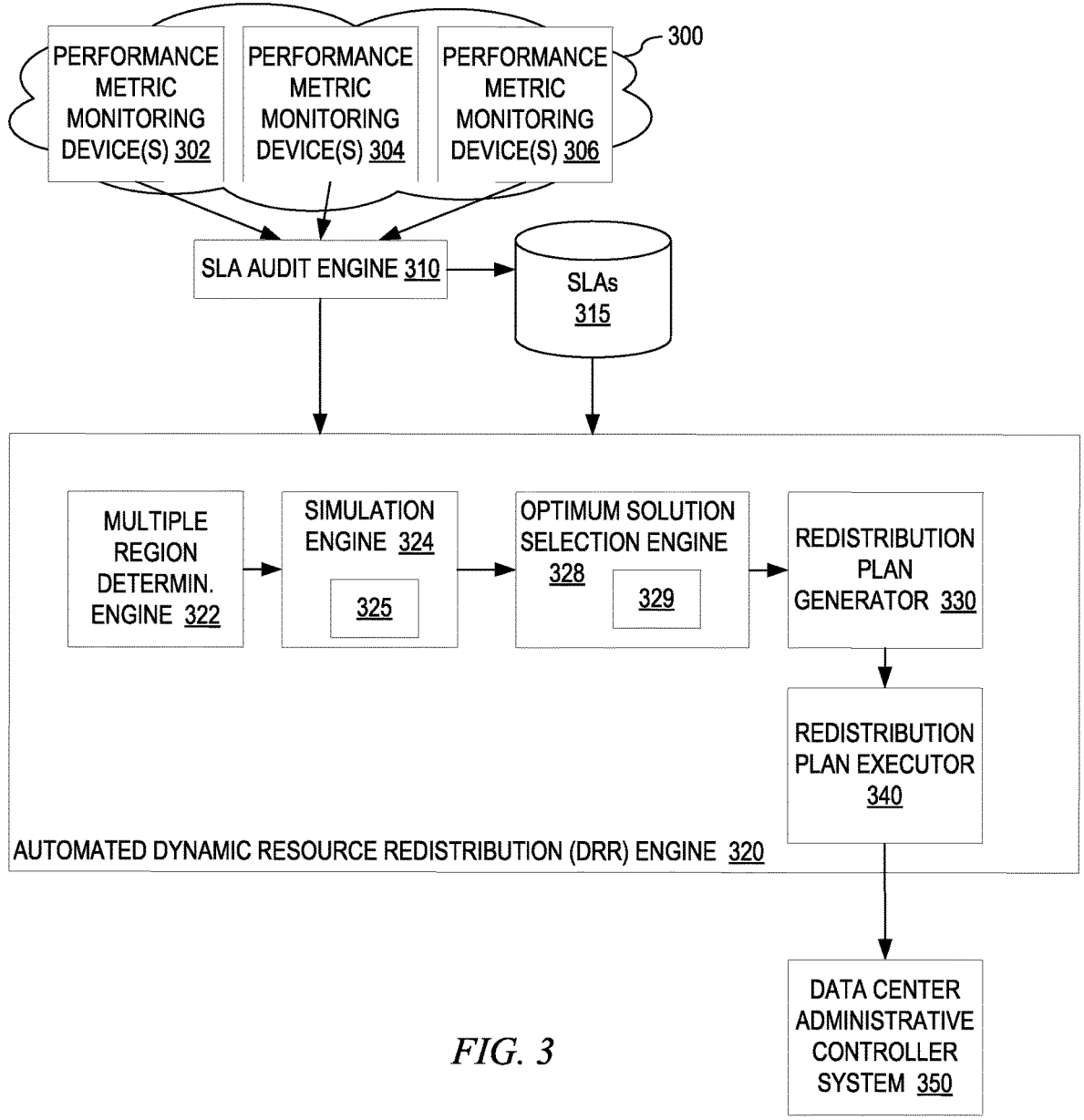
FIG. 3 is a block diagram of primary operational components of an automated dynamic resource redistribution (DRR) engine in accordance with one illustrative embodiment.

FIG. 3 is a block diagram of primary operational components of an automated dynamic resource redistribution (DRR) engine in accordance with one illustrative embodiment. As shown in FIG. 3, the automated DRR engine 320 operates in conjunction with a service level agreement audit engine 310. The SLA auditing engine 310 operates on the previously established SLA data structures 315 for an enterprise (again assuming, for purposes of illustration, multiple SLAs, each associated with a corresponding business process) and performance metric information gathered by performance metric monitoring mechanisms 302-306 in the service provider's distributed computing system infrastructure 300, to determine if SLA requirements are being met or not. The distributed computing system infrastructure 300 may comprise various computing devices, storage device, networking or communication devices, software applications, data structures, and the like, distributed over multiple regions of a distributed infrastructure which may, in some cases, correspond to different physical and/or geographical locations. The infrastructure 300 may provide the computing resources for providing services in a distributed environment, such as a cloud computing environment or the like. As such, the infrastructure 300 may provide resources for servicing business processes for one or more enterprises where the resources may be distributed across multiple regions.

In evaluating the SLA requirements of SLAs 315 by the SLA auditing engine 310, for those SLAs 315 where SLA requirements are not being met, the mechanisms of automated DRR engine 320 operate to determine an optimization to the configuration of the resources that either achieve the SLA requirements or more closely meet the SLA requirements. In particular, for those SLAs flagged by the SLA auditing engine 310 as not being satisfied, the automated DRR engine 320 operates to determine for the corresponding business process, whether the resources for servicing that business process are distributed across multiple regions in the distributed infrastructure 300. Thus, the SLA auditing engine 310 may send requests with information specifying the SLAs and business processes for which the SLA requirements are not met by the current configuration of the resources in the distributed infrastructure 300, with metadata obtained from the communications exchanged by the computing systems servicing requests associated with the business processes, to thereby identify which computing systems are involved in providing resources for servicing the requests.

A multiple region determination engine 322 operates on the requests from the SLA auditing engine 310 to determine if the SLAs specified in the information sent by the SLA auditing engine 310 indicates that requests associated with the business process of the SLA are serviced by computing systems and resources in multiple different regions of the distributed infrastructure 300, e.g., a distributed data center. The determination of whether the business process accesses resources from multiple regions may be performed based on metadata associated with the data returned to the business process by the computing systems and captured by the performance metric monitoring mechanisms 302-306, and provided to the SLA audit engine 310, which may specify the region and/or address information for the source of the data returned. The multiple region determination engine 322 may utilize a mapping data structure that correlates particular computing devices with particular regions, particular addresses, e.g., Internet Protocol (IP) addresses with a particular region, or the like. By correlating the address information or other identification information in the metadata with regions, a determination can be made as to whether the business process requests are serviced by resources in multiple regions or a single region.

For those requests sent from the SLA auditing engine 310 that correspond to multi-region SLAs additional optimization operations are performed to cause an improvement in performance metrics and reduce latency, which may satisfy SLA requirements that are not currently being satisfied. These optimizations determine when and how to reconfigure the resources by redistributing and/or consolidating resources across the multiple regions of the distribute infrastructure 300, e.g., the distributed data center. For example, the automated DRR engine 320 may, through optimization operations performed by the automated DRR engine, determine how to swap the locations of the resources, or a portion of the resources, across the regions of the data center, migrate the resources or portion thereof, or replicate the resources or portion thereof, so as to reduce the round-trip time (RTT) network communication latency and modify performance metrics to be within the SLA requirements or as close to the SLA requirements as possible. This optimization may operate to generate RTT latency and performance such that reconfiguration of the resources through migration and/or replication is minimized while generating performance metrics that meet the SLA requirements, e.g., move/replicate as little of the data as necessary in other regions as is required to achieve the SLA requirements.

To perform these optimization operations, the simulation engine 324 of the automated DRR engine 320 uses the region location information of the resources, as well as information regarding types of the resources involved in the business process and the volume of data and assets (resources) of the various computing systems of the various regions utilized in responding to requests associated with the business process to identify a usage pattern for resources of the distributed infrastructure 300, or distributed data center, that are associated with the business process. That is, the usage pattern information specifies what resources are accessed, where these resources reside, how these resources are accessed, and the performance metrics associated with accessing these resources from their current locations, e.g., the RTT for accessing the resources. This information may be obtained for each individual region where resources are accessed, and for the multi-region configuration of the specific combination of regions of the distributed infrastructure 300 involved in servicing the requests associated with the business process.

This usage pattern information is used by the simulation engine to configure a plurality of simulation models for simulating reconfigurations/redistributions of the resources across the regions of the distributed infrastructure 300, or distributed data center. The simulation engine 324 spawns multiple instances 326 of simulations of the distributed infrastructure 300 and configures these simulations based on the usage pattern information and predefined configuration information 325. The simulation engine 324 of the automated DRR engine 320 executes this plurality of simulations 326, either in parallel or sequentially, to simulate different configurations of the resources and generate predictions as to the performance metrics with regard to the various components of the distributed data center. Each simulation 326 simulates the performance of the distributed data center (infrastructure) 300 given a request associated with the business process, but using a different configuration, or distribution, of the resources across the computing systems of the regions of the distributed data center 300. This simulation is configured with parameters that model the performance of the various computing systems and resources based on the historical data gathered from the performance metric monitoring mechanisms 302-306 present in the infrastructure 300. This performance metric data specifies how each computing system and resource performs in response to requests associated with the business process, e.g., RTT or latency metrics of the corresponding computing systems' portion of the process for handling the request. Thus, the simulation may be comprised of models for each of the computing systems of the various regions as well as the resources of those computing systems which execute to simulate the corresponding computing system/resources.

Each of a plurality of possible reconfigurations or distributions of the resources may be evaluated using the different simulations 326. The particular reconfigurations or distributions of resources may be specified in accordance with configuration information 325 associated with the simulation engine 324. Each simulation 326 will generate a prediction should the resources, or a portion of the resources, be relocated, or distributed, to different computing systems of different regions of the distributed data center. The prediction includes performance metrics for handling business process requests, where these performance metrics are directed to the SLA requirements of the SLA associated with the business process that was determined to not be satisfied based on the evaluation by the SLA auditing engine 310.

The predictions generated by the simulations 326 are provided as input to the optimum solution selection engine 328 which is configured with selection criteria 329. The optimum solution selection engine 328 operates to compare the predictions to each other and to the SLA requirements of the SLA to determine which simulation results indicate a configuration or distribution of resources that causes the performance of the distributed data center (infrastructure) 300 to fall within the SLA requirements. There may be multiple configurations or distributions of resources that result in performance metrics that meet or exceed SLA requirements. Selection criteria 329 are established for selecting a solution from these configurations or distributions that meet the SLA requirements or are closest to the SLA requirements if not able to meet the SLA requirements. For example, these selection criteria 329 may include, selecting the slowest RTT configuration/distribution that still meets the SLA requirements, selecting the fastest RTT configuration/distribution that meets the SLA requirements, or other more complex selection criteria based on various performance metrics, and the like.

Based on the selected configuration/redistribution of resources, i.e., the configuration/redistribution of resources used in the simulation 326 whose results are selected as the optimum results by comparison to the SLA requirements, the redistribution plan generator 330 automatically generates a resource migration/replication plan for moving/replicating resources between the computing systems of the various regions of the distributed data center (infrastructure) 300. The plan may specify an optimum sequence of data and asset migration/replication which is then executed by the redistribution plan executor 340 by sending commands to the data enter administrative control systems 350 to initiate operations to migrate/replicate resources.

After migration/replication, based on responses from the control systems 350 indicating completion of the migration/redistribution operations, the redistribution plan executor 340 of the automated DRR engine 320 switches the connection to the migrated/replicated data and assets (resources). In the case of a migration, the previous location of data/assets may be removed. In this way, the resources are migrated/replicated so as to implement the optimized reconfiguration/redistribution of resources predicted by the simulations to satisfy SLA requirements or at least be closest to the SLA requirements if not satisfying the SLA requirements. This process may be performed for each business process to thereby optimize the resource configuration/distribution for all of the business processes affected by the SLAs.

Figure 4:
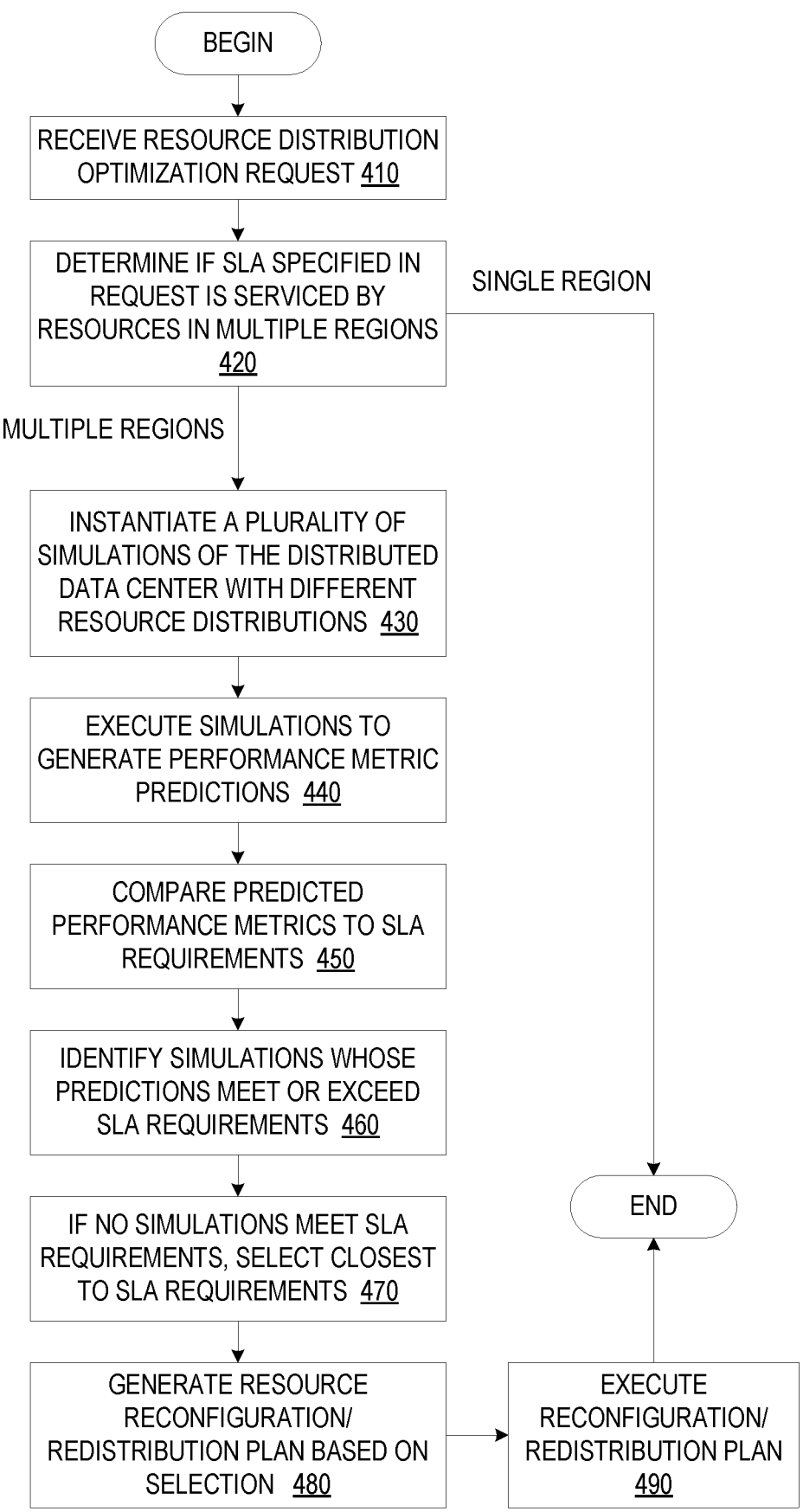
FIG. 4 is a flowchart outlining an example operation of an automated DRR engine in accordance with one illustrative embodiment.

FIG. 4 is a flowchart outlining an example operation of an automated DRR engine in accordance with one illustrative embodiment. The operation outlined in FIG. 4 assumes that the operations are performed with regard to a distributed data center. However, the illustrative embodiments are not limited to only distribute data centers and instead can be applied to any distributed data processing environment in which requests are processed by resources distributed across multiple regions that cause latencies in the round-trip time (RTT) for responding to the requests.

The operation outlined in FIG. 4 may be implemented by an automated DRR engine in accordance with one illustrative embodiment, such as automated DRR engine 320 in FIG. 3, for example. It should be appreciated that the operations outlined in FIG. 4 are specifically performed automatically by an improved computer tool of the illustrative embodiments and are not intended to be, and cannot practically be, performed by human beings either as mental processes or by organizing human activity. To the contrary, while human beings may initiate the performance of the operation set forth in FIG. 4 and may make use of the results generated as a consequence of the operations set forth in FIG. 4, the operations in FIG. 4 themselves are specifically performed by the improved computing tool in an automated manner.

As shown in FIG. 4, the operation starts by receiving a request specifying an SLA associated with a business process for which SLA requirements are not being met by current distributions of resources in the distributed data center (step 410). The request includes metadata information for the computing systems providing the resources used to service requests associated with the business process with which the SLA is associated. Based on the metadata information and other information of the request, the regions of the resources are determined, and a determination is made as to whether the SLA is a multi-region SLA because it uses resources distributed over a plurality of regions (step 420). If the SLA is not a multi-region SLA, the operation terminates. If the SLA is a multi-region SLA, the region information as well as information from the received SLA request, including the volume of data and assets utilized to service the requests associated with the business process, are used to instantiate multiple instances of a simulation of the distributed data center (step 430). These simulations simulate different configurations or redistributions of resources across regions in the distributed data center based on simulated requests. These simulations comprise models of the computing components in the various regions as well as the resources for servicing the requests. Such simulations may be configured based on various performance metrics, such as RTT, volume of data/assets accessed, etc.

The simulations are executed to generate predictions as to one or more performance metrics, e.g., RTT of the various legs of the response to the request (step 440). The predicted performance metrics for the various simulation instances are compared to SLA requirements to identify which simulations generate predicted performance metrics that satisfy the SLA requirements (step 450). Predicted performance metrics for the various simulation instances that meet or exceed the SLA requirements are identified and an optimum prediction is selected based on specified selection criteria (step 460). Alternatively, if none of the predicted performance metrics meet or exceed the SLA requirements, the predicted performance metric closest to the SLA requirements is selected (step 470). The resource reconfiguration/redistribution represented in the configuration of the simulation corresponding to the selected predicted performance metrics is then used to generate a resource migration/replication plan (step 480). The resource reconfiguration/redistribution plan is then executed (step 490) and the operation terminates.

Thus, the illustrative embodiments provide an improved computing tool and improved computing tool operation that facilitates an SLA driven approach to resource relocation/redistribution for business processes. The improved computing tool operates to identify those SLAs whose service requirements are not being met when processing requests using an existing resource distribution, for example in a distributed data center hosted by a cloud computing infrastructure service. For those SLAs whose service requirements are not being met, for those business processes that are multi-regional, simulations of the distributed infrastructure with various reconfigurations/redistributions of resources are executed to generate predicted performance metrics for these different reconfigurations/redistributions of resources, such as with regard to latency and round-trip time. Based on selection criteria, and the result of these simulations, an optimum reconfiguration/redistribution of resources is selected and implemented by generating a migration/replication plan and executing it in the distributed infrastructure.

From the above, it is clear that the problem addressed by the present invention is specifically a problem in the computer arts and specifically in multi-region distributed infrastructures, an example of which is a distributed data center hosted by a cloud computing system service provider. The solution to this problem is an improved computing tool and improved computing tool operations according to one or more of the illustrative embodiments described previously.

Figure 5:
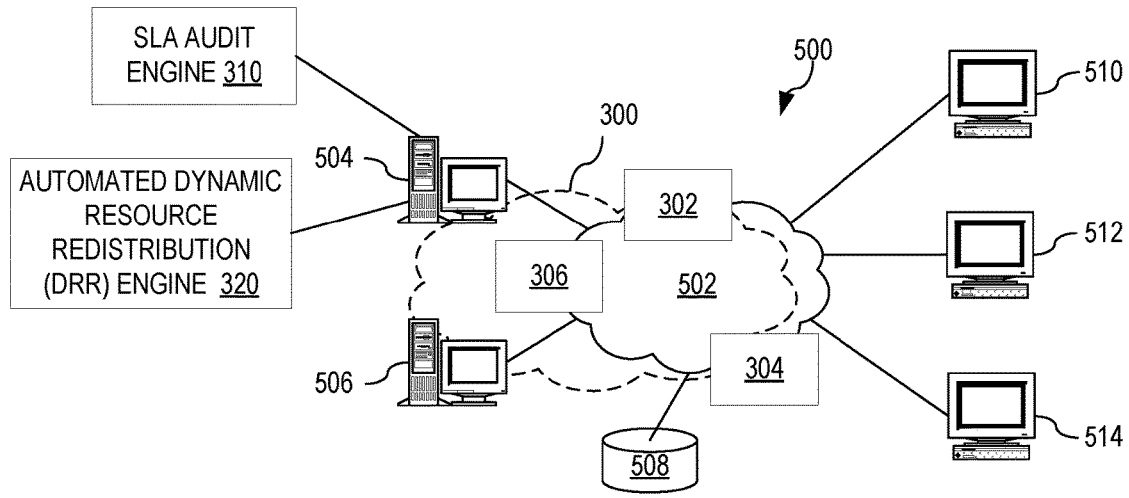
FIG. 5 is an example diagram of a distributed data processing system in which aspects of the illustrative embodiments may be implemented.

Thus, from the above, it can be appreciated that the illustrative embodiments may be utilized in many different types of data processing environments. In order to provide a context for the description of the specific elements and functionality of the illustrative embodiments, FIGS. 5 and 2 are provided hereafter as example environments in which aspects of the illustrative embodiments may be implemented. It should be appreciated that FIGS. 5 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 5 depicts a pictorial representation of an example distributed data processing system in which aspects of the illustrative embodiments may be implemented. Distributed data processing system 500 may include a network of computers in which aspects of the illustrative embodiments may be implemented. The distributed data processing system 500 contains at least one network 502, which is the medium used to provide communication links between various devices and computers connected together within distributed data processing system 500. The network 502 may include connections, such as wire, wireless communication links, or fiber optic cables.

In the depicted example, server 504 and server 506 are connected to network 502 along with storage unit 508. In addition, clients 510, 512, and 514 are also connected to network 502. These clients 510, 512, and 514 may be, for example, personal computers, network computers, or the like. In the depicted example, server 504 provides data, such as boot files, operating system images, and applications to the clients 510, 512, and 514. Clients 510, 512, and 514 are clients to server 504 in the depicted example. Distributed data processing system 500 may include additional servers, clients, and other devices not shown.

In the depicted example, distributed data processing system 500 is the Internet with network 502 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 500 may also be implemented to include a number of different types of networks, such as for example, an intranet, a local area network (LAN), a wide area network (WAN), or the like. As stated above, FIG. 5 is intended as an example, not as an architectural limitation for different embodiments of the present invention, and therefore, the particular elements shown in FIG. 5 should not be considered limiting with regard to the environments in which the illustrative embodiments of the present invention may be implemented.

As shown in FIG. 5, one or more of the computing devices, e.g., server 504, may be specifically configured to implement an SLA audit engine 310 and an automated DRR engine 320. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 504, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described herein above, the implementation of the mechanisms of the illustrative embodiments improves the functionality of the computing device and provides a useful and concrete result that facilitates automated and intelligent reconfiguration/redistribution of resources in a distributed infrastructure in order to achieve or approximate SLA requirements.

A plurality of the computing devices in FIG. 5 may operate to provide a cloud service, such as a cloud infrastructure service, which hosts a service for one or more enterprises, such as a data center. The resources for providing the service may be distributed across these computing devices such that the cloud infrastructure service is a distributed infrastructure service, e.g., a distributed data center. The distributed infrastructure may span multiple different regions, such as regions associated with different physical locations and/or different geographical locations. Users of client computing devices, such as clients 510-514, may send requests for accessing resources of the distributed infrastructure service, e.g., the distributed data center. Performance monitoring metric mechanisms may be deployed in the distributed infrastructure to measure performance metrics associated with processing the requests and report those performance metrics to the SLA audit engine 310. The SLA audit engine 310, as described previously, may identify SLAs whose requirements are not being met and report the information to the automated DRR engine 320 for optimization of resource configuration/distribution.

Figure 6:
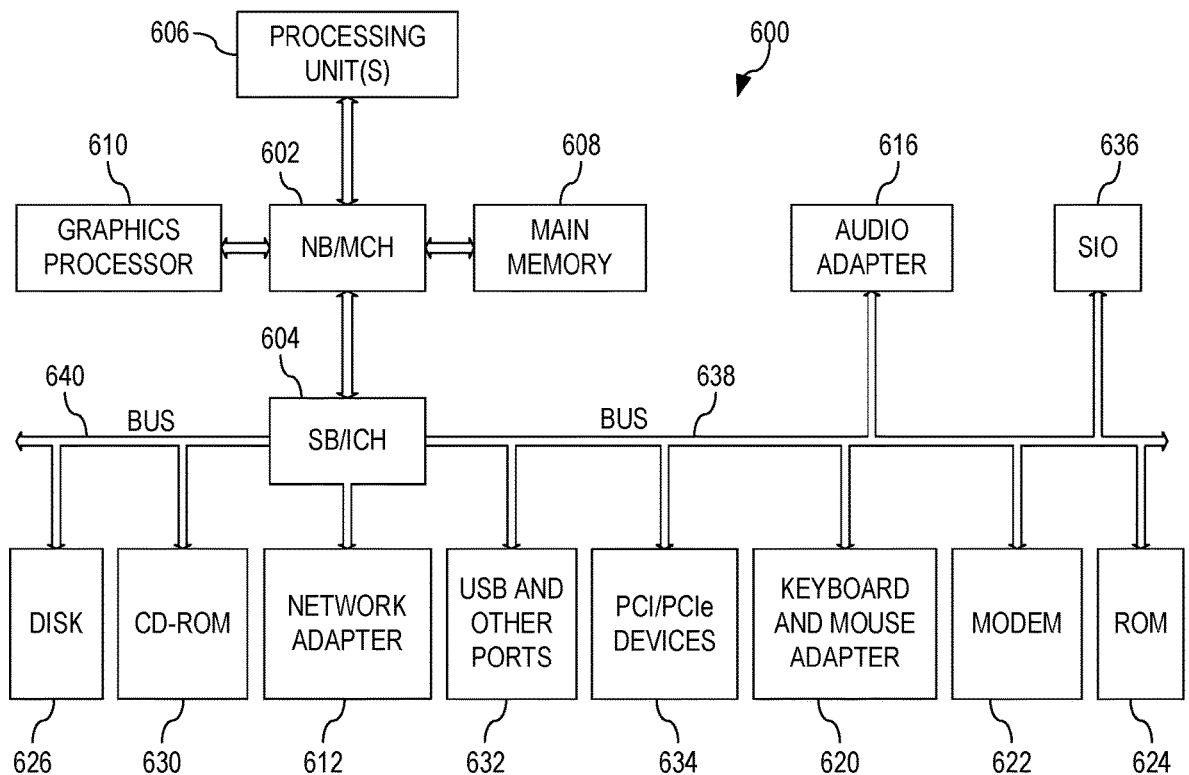
FIG. 6 is an example block diagram of a computing device in which aspects of the illustrative embodiments may be implemented.

As described above, the mechanisms of the illustrative embodiments utilize specifically configured computing devices, or data processing systems, to perform the operations for SLA driven resource configuration/redistribution in multi-regional distributed infrastructures. These computing devices, or data processing systems, may comprise various hardware elements which are specifically configured, either through hardware configuration, software configuration, or a combination of hardware and software configuration, to implement one or more of the systems/subsystems described herein. FIG. 6 is a block diagram of just one example data processing system in which aspects of the illustrative embodiments may be implemented. Data processing system 600 is an example of a computer, such as server 504 in FIG. 5, in which computer usable code or instructions implementing the processes and aspects of the illustrative embodiments of the present invention may be located and/or executed so as to achieve the operation, output, and external effects of the illustrative embodiments as described herein.

In the depicted example, data processing system 600 employs a hub architecture including north bridge and memory controller hub (NB/MCH) 602 and south bridge and input/output (I/O) controller hub (SB/ICH) 604. Processing unit 606, main memory 608, and graphics processor 610 are connected to NB/MCH 602. Graphics processor 610 may be connected to NB/MCH 602 through an accelerated graphics port (AGP).

In the depicted example, local area network (LAN) adapter 612 connects to SB/ICH 604. Audio adapter 616, keyboard and mouse adapter 620, modem 622, read only memory (ROM) 624, hard disk drive (HDD) 626, CD-ROM drive 630, universal serial bus (USB) ports and other communication ports 632, and PCI/PCIe devices 634 connect to SB/ICH 604 through bus 638 and bus 640. PCI/PCIe devices may include, for example, Ethernet adapters, add-in cards, and PC cards for notebook computers. PCI uses a card bus controller, while PCIe does not. ROM 624 may be, for example, a flash basic input/output system (BIOS).

HDD 626 and CD-ROM drive 630 connect to SB/ICH 604 through bus 640. HDD 626 and CD-ROM drive 630 may use, for example, an integrated drive electronics (IDE) or serial advanced technology attachment (SATA) interface. Super I/O (SIO) device 636 may be connected to SB/ICH 604.

An operating system runs on processing unit 606. The operating system coordinates and provides control of various components within the data processing system 600 in FIG. 6. As a client, the operating system may be a commercially available operating system such as Microsoft® Windows 10®. An object-oriented programming system, such as the Java™ programming system, may run in conjunction with the operating system and provides calls to the operating system from Java™ programs or applications executing on data processing system 600.

As a server, data processing system 600 may be, for example, an IBM eServer™ System p° computer system, Power™ processor based computer system, or the like, running the Advanced Interactive Executive (AIX®) operating system or the LINUX® operating system. Data processing system 600 may be a symmetric multiprocessor (SMP) system including a plurality of processors in processing unit 606. Alternatively, a single processor system may be employed.

Instructions for the operating system, the object-oriented programming system, and applications or programs are located on storage devices, such as HDD 626, and may be loaded into main memory 608 for execution by processing unit 606. The processes for illustrative embodiments of the present invention may be performed by processing unit 606 using computer usable program code, which may be located in a memory such as, for example, main memory 608, ROM 624, or in one or more peripheral devices 626 and 630, for example.

A bus system, such as bus 638 or bus 640 as shown in FIG. 6, may be comprised of one or more buses. Of course, the bus system may be implemented using any type of communication fabric or architecture that provides for a transfer of data between different components or devices attached to the fabric or architecture. A communication unit, such as modem 622 or network adapter 612 of FIG. 6, may include one or more devices used to transmit and receive data. A memory may be, for example, main memory 608, ROM 624, or a cache such as found in NB/MCH 602 in FIG. 6.

As mentioned above, in some illustrative embodiments the mechanisms of the illustrative embodiments may be implemented as application specific hardware, firmware, or the like, application software stored in a storage device, such as HDD 626 and loaded into memory, such as main memory 608, for executed by one or more hardware processors, such as processing unit 606, or the like. As such, the computing device shown in FIG. 6 becomes specifically configured to implement the mechanisms of the illustrative embodiments and specifically configured to perform the operations and generate the outputs described herein with regard to the automated DRR engine.

Those of ordinary skill in the art will appreciate that the hardware in FIGS. 5 and 6 may vary depending on the implementation. Other internal hardware or peripheral devices, such as flash memory, equivalent non-volatile memory, or optical disk drives and the like, may be used in addition to or in place of the hardware depicted in FIGS. 5 and 6. Also, the processes of the illustrative embodiments may be applied to a multiprocessor data processing system, other than the SMP system mentioned previously, without departing from the spirit and scope of the present invention.

Moreover, the data processing system 600 may take the form of any of a number of different data processing systems including client computing devices, server computing devices, a tablet computer, laptop computer, telephone or other communication device, a personal digital assistant (PDA), or the like. In some illustrative examples, data processing system 600 may be a portable computing device that is configured with flash memory to provide non-volatile memory for storing operating system files and/or user-generated data, for example. Essentially, data processing system 600 may be any known or later developed data processing system without architectural limitation.

As mentioned above, in some illustrative embodiments, the distributed data center, or other distributed infrastructure, may be provided via a cloud computing system. The following description provides an example of cloud computing which may be used to provide the cloud computing data processing system to host the services with which the mechanisms of the illustrative embodiments may be implemented. It should be understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 7:
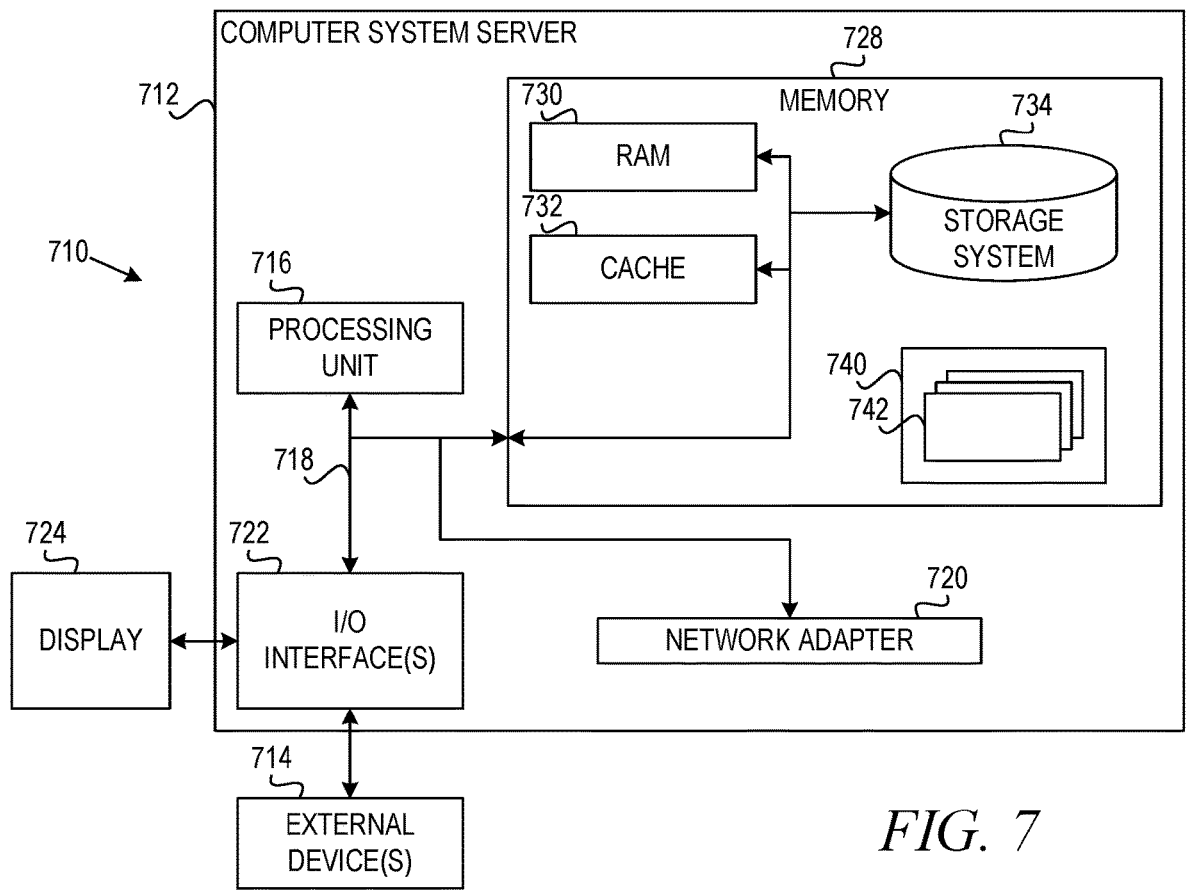
FIG. 7 depicts a cloud computing node according to an illustrative embodiment.

Referring now to FIG. 7, a schematic of an example of a cloud computing node is shown. Cloud computing node 710 is only one example of a suitable cloud computing node and is not intended to suggest any limitation as to the scope of use or functionality of embodiments of the invention described herein. Regardless, cloud computing node 710 is capable of being implemented and/or performing any of the functionality set forth hereinabove.

In cloud computing node 710 there is a computer system/server 712, which is operational with numerous other general purpose or special purpose computing system environments or configurations. Examples of well-known computing systems, environments, and/or configurations that may be suitable for use with computer system/server 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 712 may be described in the general context of computer system executable instructions, such as program modules, being executed by a computer system. Generally, program modules may include routines, programs, objects, components, logic, data structures, and so on that perform particular tasks or implement particular abstract data types. Computer system/server 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 712 in cloud computing node 10 is shown in the form of a general-purpose computing device. The components of computer system/server 712 may include, but are not limited to, one or more processors or processing units 716, a system memory 728, and a bus 718 that couples various system components including system memory 728 to processor 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 712 typically includes a variety of computer system readable media. Such media may be any available media that is accessible by computer system/server 712, and it includes both volatile and non-volatile media, removable and non-removable media.

System memory 728 can include computer system readable media in the form of volatile memory, such as random access memory (RAM) 730 and/or cache memory 732. Computer system/server 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are configured to carry out the functions of embodiments of the invention.

Program/utility 740, having a set (at least one) of program modules 742, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer system/server 712 may also communicate with one or more external devices 714 such as a keyboard, a pointing device, a display 724, etc.; one or more devices that enable a user to interact with computer system/server 712; and/or any devices (e.g., network card, modem, etc.) that enable computer system/server 712 to communicate with one or more other computing devices. Such communication can occur via Input/Output (I/O) interfaces 722. Still yet, computer system/server 712 can communicate with one or more networks such as a local area network (LAN), a general wide area network (WAN), and/or a public network (e.g., the Internet) via network adapter 720. As depicted, network adapter 720 communicates with the other components of computer system/server 712 via bus 718. It should be understood that although not shown, other hardware and/or software components could be used in conjunction with computer system/server 712. Examples, include, but are not limited to: microcode, device drivers, redundant processing units, external disk drive arrays, RAID systems, tape drives, and data archival storage systems, etc.

Figure 8:
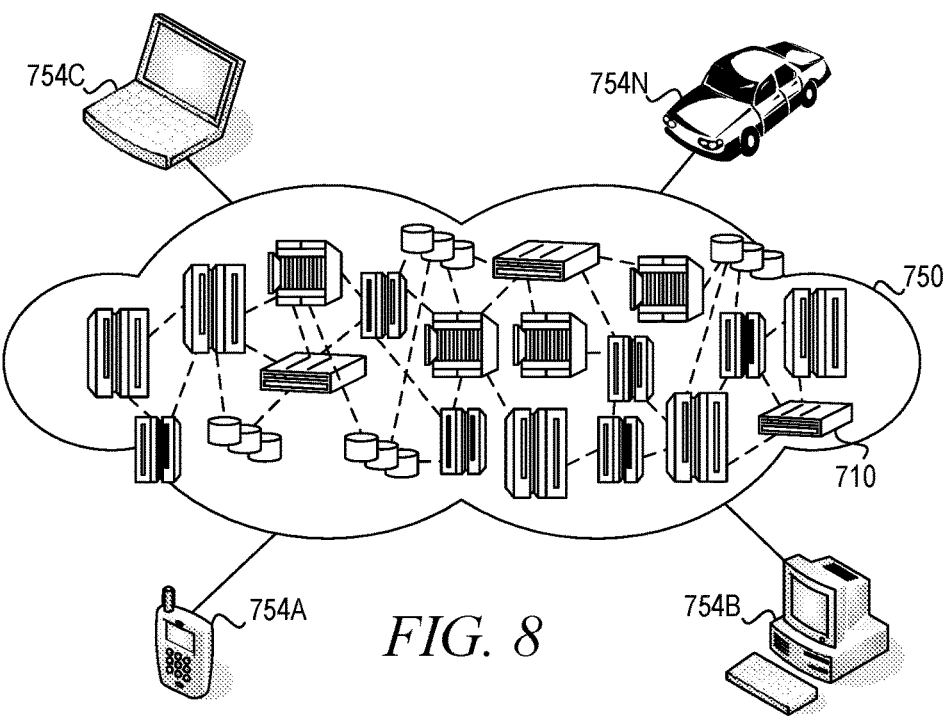
FIG. 8 depicts a cloud computing environment according to an illustrative embodiment.

Referring now to FIG. 8, illustrative cloud computing environment 750 is depicted. As shown, cloud computing environment 750 comprises one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 8 are intended to be illustrative only and that computing nodes 10 and cloud computing environment 750 can communicate with any type of computerized device over any type of network and/or network addressable connection (e.g., using a web browser).

Figure 9:
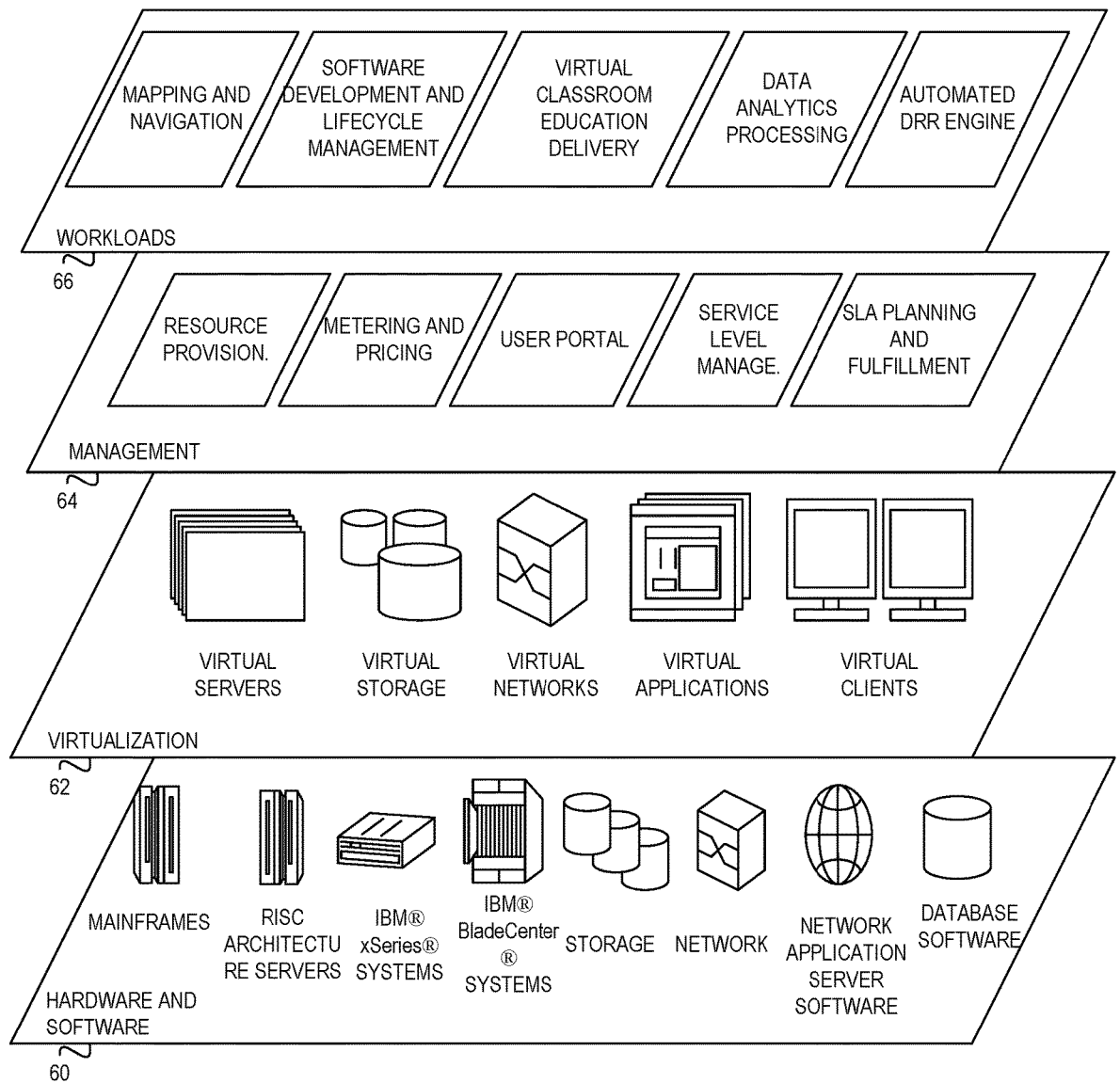
FIG. 9 depicts abstraction model layers according to an illustrative embodiment.

Referring now to FIG. 9, a set of functional abstraction layers provided by cloud computing environment 750 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 760 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 762 provides an abstraction layer from which the following examples of virtual entities may be provided: virtual servers; virtual storage; virtual networks, including virtual private networks; virtual applications and operating systems; and virtual clients.

In one example, management layer 764 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 766 provides examples of functionality for which the cloud computing environment may be utilized. Examples of workloads and functions which may be provided from this layer include: mapping and navigation; software development and lifecycle management; virtual classroom education delivery; data analytics processing; transaction processing; and SLA audit engine and automated dynamic resource redistribution (DRR) engine.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for redistributing computing resources in a distributed data processing system, the method comprising:
    collecting performance metrics of processing of requests associated with a computer operation for which there is an established service level agreement (SLA) having at least one SLA performance metric;
    comparing the performance metrics to the at least one SLA performance metric to select an SLA for which the at least one SLA performance metric is not being met;
    executing a plurality of computer simulations comprising computer models of computing resources of the distributed data processing system, each computer simulation, in the plurality of computer simulations, simulating a different distribution of computing resources in the distributed data processing system;
    comparing simulation results of the plurality of computer simulations to the at least one SLA performance metric to identify one or more computer simulations whose results either meet, exceed, or are closest to the at least one SLA performance metric of the selected SLA;
    selecting a distribution of computing resources, corresponding to a computer simulation, in the one or more computer simulations, whose simulation results either meet, exceed, or are closest to the at least one SLA performance metric; and
    redistributing the computing resources of the distributed data processing system in accordance with the selected distribution of computing resources.

2. The method of claim 1, wherein comparing the simulation results of the computer simulations to the at least one SLA performance metric further comprises:
    identifying a first set of one or more SLAs for which the at least one SLA performance metric is not being met; and
    identifying a second set of one or more SLAs, from the first set of SLAs, where computer resources for performing the computer operation are distributed across a plurality of regions of the distributed data processing system, and wherein the selected SLA is an SLA in the second set of one or more SLAs.

3. The method of claim 2, wherein the plurality of regions correspond to a plurality of different computer systems or storage systems physically located remotely from each other.

4. The method of claim 1, wherein selecting the distribution of computer resources comprises selecting the distribution of computer resources whose corresponding computer simulation generates simulation results that meet the at least one SLA performance metric and whose simulation results are closest to the at least one SLA performance metric relative to simulation results of other ones of the plurality of computer simulations.

5. The method of claim 1, wherein, in response to none of the simulation results of the plurality of computer simulations achieving a performance that meets the at least one SLA performance metric, selecting the distribution of computing resources comprises selecting the distribution of computer resources corresponding to a computer simulation whose simulation results do not meet the at least one SLA performance metric, but is closest to the at least one SLA performance metric relative to simulation results of other ones of the plurality of computer simulations.

6. The method of claim 1, wherein the computing resources comprise data structures stored in a plurality of different data storage systems and the computer operation is a computer operation for accessing the data structures from the plurality of different data storage systems, and wherein redistributing the computing resources of the distributed data processing system in accordance with the selected distribution of computing resources comprises migrating or replicating one or more of the data structures to different data storage systems to reduce latency in accessing the one or more data structures.

7. The method of claim 1, wherein the SLA performance metric is a measure of latency in performing the computer operation.

8. The method of claim 7, wherein the measure of latency is a round trip time for performing the computer operation.

9. The method of claim 1, wherein the distributed data processing system is a distributed data center.

10. The method of claim 9, wherein the distributed data center is hosted by one or more service providers of a cloud-based computing system.

11. A computer program product comprising a computer readable storage medium having a computer readable program stored therein, wherein the computer readable program, when executed in at least one computing system, causes the at least one computing system to:
    collect performance metrics of processing of requests associated with a computer operation for which there is an established service level agreement (SLA) having at least one SLA performance metric;
    compare the performance metrics to the at least one SLA performance metric to select an SLA for which the at least one SLA performance metric is not being met;

execute a plurality of computer simulations comprising computer models of computing resources of a distributed data processing system, each computer simulation, in the plurality of computer simulations, simulating a different distribution of computing resources in the distributed data processing system;

compare simulation results of the plurality of computer simulations to the at least one SLA performance metric to identify one or more computer simulations whose results either meet, exceed, or are closest to the at least one SLA performance metric of the selected SLA;

select a distribution of computing resources, corresponding to a computer simulation, in the one or more computer simulations, whose simulation results either meet, exceed, or are closest to the at least one SLA performance metric; and redistribute the computing resources of the distributed data processing system in accordance with the selected distribution of computing resources.

12. The computer program product of claim 11, wherein comparing the simulation results of the computer simulations to the at least one SLA performance metric further comprises:

identifying a first set of one or more SLAs for which the at least one SLA performance metric is not being met; and identifying a second set of one or more SLAs, from the first set of SLAs, where computer resources for performing the computer operation are distributed across a plurality of regions of the distributed data processing system, and wherein the selected SLA is an SLA in the second set of one or more SLAs.

13. The computer program product of claim 12, wherein the plurality of regions correspond to a plurality of different computer systems or storage systems physically located remotely from each other.

14. The computer program product of claim 11, wherein selecting the distribution of computer resources comprises selecting the distribution of computer resources whose corresponding computer simulation generates simulation results that meet the at least one SLA performance metric and whose simulation results are closest to the at least one SLA performance metric relative to simulation results of other ones of the plurality of computer simulations.

15. The computer program product of claim 11, wherein, in response to none of the simulation results of the plurality of computer simulations achieving a performance that meets the at least one SLA performance metric, selecting the distribution of computing resources comprises selecting the distribution of computer resources corresponding to a computer simulation whose simulation results do not meet the at least one SLA performance metric, but is closest to the at least one SLA performance metric relative to simulation results of other ones of the plurality of computer simulations.

16. The computer program product of claim 11, wherein the computing resources comprise data structures stored in a plurality of different data storage systems and the computer operation is a computer operation for accessing the data structures from the plurality of different data storage systems, and wherein redistributing the computing resources of the distributed data processing system in accordance with the selected distribution of computing resources comprises migrating or replicating one or more of the data structures to different data storage systems to reduce latency in accessing the one or more data structures.

17. The computer program product of claim 11, wherein the SLA performance metric is a measure of latency in performing the computer operation.

18. The computer program product of claim 17, wherein the measure of latency is a round trip time for performing the computer operation.

19. The computer program product of claim 11, wherein the distributed data processing system is a distributed data center.

20. An apparatus comprising:

at least one processor; and at least one memory coupled to the at least one processor, wherein the memory comprises instructions which, when executed by the at least one processor, cause the at least one processor to:

collect performance metrics of processing of requests associated with a computer operation for which there is an established service level agreement (SLA) having at least one SLA performance metric;

compare the performance metrics to the at least one SLA performance metric to select an SLA for which the at least one SLA performance metric is not being met;

execute a plurality of computer simulations comprising computer models of computing resources of a distributed data processing system, each computer simulation, in the plurality of computer simulations, simulating a different distribution of computing resources in the distributed data processing system;

compare simulation results of the plurality of computer simulations to the at least one SLA performance metric to identify one or more computer simulations whose results either meet, exceed, or are closest to the at least one SLA performance metric of the selected SLA;

select a distribution of computing resources, corresponding to a computer simulation, in the one or more computer simulations, whose simulation results either meet, exceed, or are closest to the at least one SLA performance metric; and redistribute the computing resources of the distributed data processing system in accordance with the selected distribution of computing resources.

* * * * *